No. 879,578. PATENTED FEB. 18, 1908.
I. OSGOOD.
BEARING.
APPLICATION FILED OCT. 4, 1906.
2 SHEETS—SHEET 1.
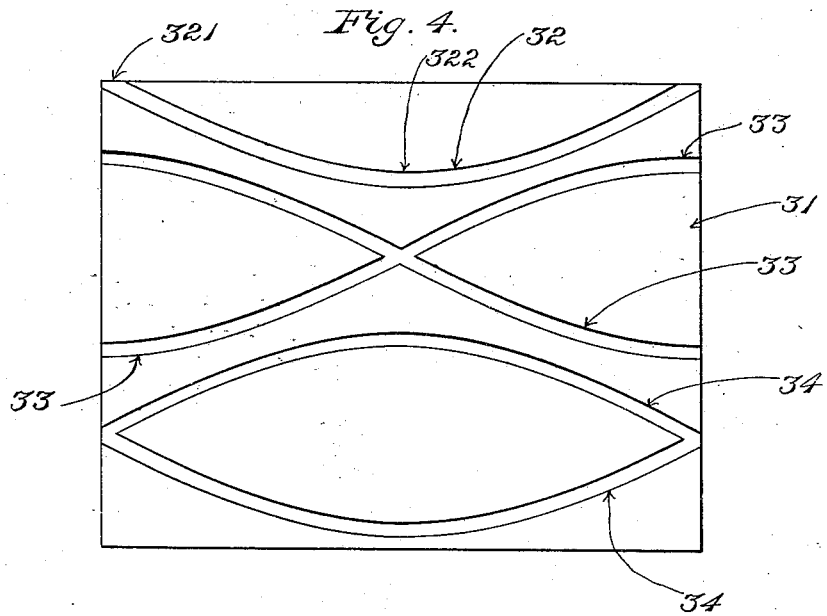
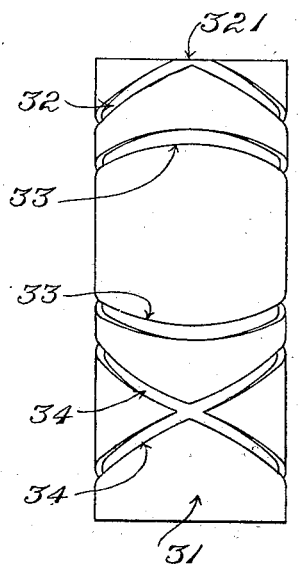
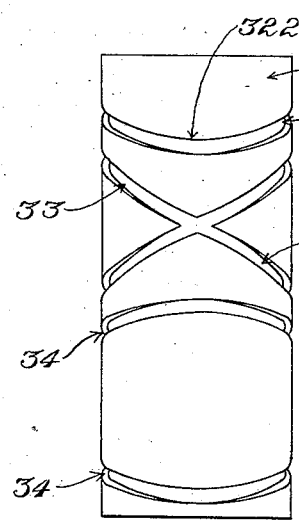
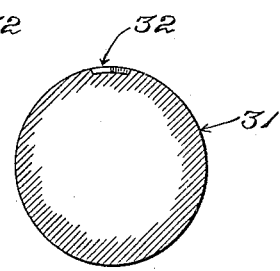
Witnesses:
Oscar F. Hill
Edith J. Anderson
Inventor:
Isaac Osgood
by Chas. F. Randall
Attorney.

No. 879,578. PATENTED FEB. 18, 1908.
I. OSGOOD.
BEARING.
APPLICATION FILED OCT. 4, 1906.
2 SHEETS—SHEET 2.
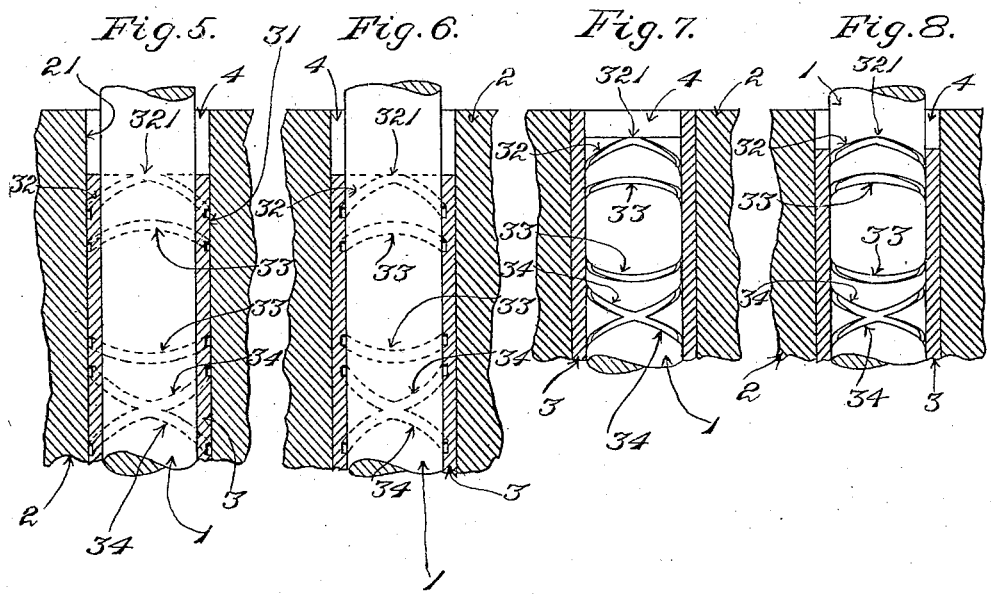
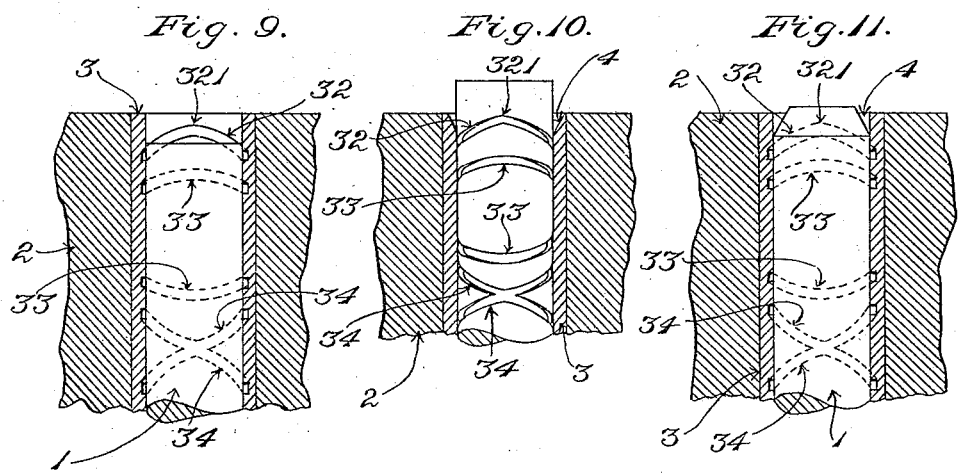
Witnesses:
Oscar F. Hill
Edith J. Anderson.
Inventor:
Isaac Osgood
by Chas. F. Randall
Attorney.

UNITED STATES PATENT OFFICE.

ISAAC OSGOOD, OF AMESBURY, MASSACHUSETTS.

BEARING.

No. 879,578.  Specification of Letters Patent.  Patented Feb. 18, 1908.

Application filed October 4, 1906. Serial No. 337,350.

*To all whom it may concern:*

Be it known that I, ISAAC OSGOOD, a citizen of the United States, residing at Amesbury, in the county of Essex, State of Massachusetts, have invented a certain new and useful Improvement in Bearings, of which the following is a specification, reference being had therein to the accompanying drawings.

The invention relates, more particularly, to upright bearings. In the case of bearings of this class it is difficult to effect proper lubrication of the relatively moving contact surfaces. Oil or other fluid or viscid lubricant supplied thereto gradually works downward, and although capillary attraction will operate to keep the lubricant raised more or less above the bottoms of the said surfaces, the height to which this will take place effectively is not very great. Consequently, the upper portions of upright bearings tend to work dry.

The object of the invention is to provide means for feeding lubricant to upright bearings so that the upper portions of the contacting surfaces of a bearing of such class, as well as the remaining portions below, shall be kept supplied, and for circulating the lubricant and distributing the same lengthwise of the bearing.

In accordance with the invention, I form one of the coacting bearing-surfaces of an upright bearing with a continuous return groove winding around the same obliquely in reverse directions lengthwise of the upper portion of the bearing, and I provide in conjunction with such groove a pocket or well for lubricant, with which pocket or well the elevated portion of the groove communicates and from which lubricant passes into the said portion of the groove. The lubricant which thus enters the said elevated portion of the groove fills the groove and is caused by the relative rotation of the surfaces aforesaid to circulate throughout all portions of the groove. From the groove all portions of the bearing surfaces within the length of the vertical extent or traverse of the groove are kept supplied with the lubricant, which latter gradually working downward also keeps the lower portions of the bearing surfaces supplied. I form in addition one or more continuous spiral return grooves in one of the bearing surfaces below the groove first mentioned, the additional groove or grooves interlapping with the groove first mentioned and with one another without intersecting. These additional grooves collect the lubricant as it passes downward within the bearing, forming storage pockets for the lubricant, within which the latter is caused to circulate while rotation is maintained and from which the lubricant finds its way to the intervening portions of the contacting surfaces. From the interlapping of the various grooves it results that although the different grooves do not intersect one another, complete lubrication of all portions of the bearing surfaces is effected. The grooves retain more or less lubricant at all times. In addition, by means of the grooves lubricant which may have collected at the bottom of the bearing while rotation has been suspended will be raised and carried upward by the successive grooves to the higher portions of the bearing.

The drawings illustrate different embodiments of the features of the invention.

In the drawings,—Figure 1 shows in elevation a cylindrical bearing surface grooved in conformity with the invention. Fig. 2 is an elevation of the opposite half of the surface which is represented in Fig. 1. Fig. 3 is a plan view of Figs. 1 and 2. Fig. 4 is a development in a plan of the bearing surface of the preceding figures. Fig. 5 is a view in vertical transverse section of a bearing. Figs. 6, 7, 8, 9, 10 and 11 are similar views showing other embodiments of the invention.

Referring, first, to Fig. 5, at 1 and 2 are parts which are operatively related with each other after the manner of a bearing, the interior part 1 being shown as cylindrical in cross-section, and the outer part 2 surrounding the former. The surface 21 of the bore within or through the part or member 2 constitutes one bearing surface, while the outer surface 31 of a bush or bushing 3 which is fixed upon the exterior of the cylinder 1 constitutes the other bearing surface. Part 2 may consist of a fixed or stationary bearing member, suitably mounted or supported, and part 1 may be a rotatable shaft, or the latter part may be a fixed stud or pin, and the former a rotatable wheel, pulley or the like. The groove or grooves is or are formed in the surface 31 of the bush or bushing 3. Having reference more particularly to Figs. 1 to 4, the groove which is formed in the upper portion of the bearing surface 31 is designated 32. Beginning at the elevated point 321, Figs. 1 and 4, the said groove extends spirally around the surface 31 first downward to the point 322, Figs. 2 and 4, and then upward again to the point of beginning. The pocket or well from which lubricant is supplied to the groove 32 is designated 4 in Fig. 5. In the said figure it consists of an annular chamber above the upper end of the bush or bushing 3 and located between the upper portion of the outer part or member 2 and the inner part or member 1. In Figs. 1, 4 and 5, the highest portion of the groove 321 intersects the top edge of the bush or bushing forming an opening for the admission of lubricant from the pocket or well 4 into the groove. 33 and 34 are the additional grooves which are formed in the surface 31 below the groove 32. Each thereof is a continuous spiral groove winding first in one direction lengthwise of the stud, and then returning in the opposite direction along the latter. From this characteristic, which is shared in common with the groove 32, I term the grooves "return" grooves. In the case of the grooves 33 and 34 the respective portions of each of such grooves cross each other as indicated in Figs. 1, 2 and 4. As will be seen from Fig. 4 each complete groove is separated from the one below it, but the downwardly extending bend of one groove extends to a lower point than the top of the upwardly extending bend of the next groove below, thereby producing the interlapping which is most clearly apparent in Fig. 4. As previously stated herein the different grooves do not intersect one another.

Each groove constitutes a spiral container for oil or other lubricant. When the latter is supplied to the pocket or well 4 it finds access to the top groove 32 by way of the entrance at 321 and fills such groove, a portion thereof passing down into the next groove 33. Some of the oil or lubricant works its way down into the groove 34. By the relative rotation of the bearing surfaces the lubricating material is kept in continuous circulation within each groove, thus keeping bearing surfaces well supplied between the top and bottom points which are reached by the groove. Inasmuch as the grooves interlap with each other in the manner above stated, no portion of the lengths of the bearing surfaces is left unsupplied. When rotation is discontinued, a large proportion of the lubricating material remains held within the respective grooves. When rotation is resumed the said material is again caused to circulate. It will be perceived that as already described the foregoing arrangement of grooves will operate to raise the lubricating material from an accumulation at the bottom of the bearing and feed the same into the upper grooves.

Fig. 6 illustrates an embodiment of the invention in which the bush or bushing 3 is fixed within the interior of the bore of the part or member 2, and has the grooves formed in the inner surface thereof.

Fig. 7 illustrates an embodiment of the invention in which the grooves are formed in the exterior surface of the cylindrical part 1, the pocket or well for liquid material being formed by causing the top portions of the part 2 and bush 3 to project above the upper end of the said part 1.

Fig. 8 illustrates an embodiment of the invention resembling that of Fig. 6 but in which the grooves are formed in the surface of the part 1, and in which also the upper portion or bend of the groove 32 rises above the bottom of the pocket or well 4 so as to receive the oil or lubricant from the said pocket or well.

Fig. 9 illustrates an embodiment of the invention resembling that in Fig. 7, but having the grooves formed in the inner surface of the bush or bushing 3, and the upper portion of the top groove 32 rising above the upper end of the cylindrical part or member 1.

Fig. 10 illustrates an embodiment of the invention in which the cylindrical part or member 1 has the grooves formed in its exterior surface, the pocket or well 4 being formed by chambering out the upper end of the bush or bushing 3.

In Fig. 11 the grooves are formed in the upper surface of the bush or bushing 3, the pocket or well 4 being provided by reducing in diameter the upper end of the cylindrical part or member 1.

What is claimed as the invention is:—

1. In an upright bearing, in combination, coacting bearings, one thereof formed with a continuous return groove winding around the same obliquely in reverse directions lengthwise of the upper portion of the bearing, the said bearing having in conjunction with the said groove a lubricant pocket with which the elevated portion of the groove communicates and from which lubricant passes into the groove, and also having below the said groove one or more obliquely extending grooves interlapping with the former and with one another without intersecting.

2. In an upright bearing, in combination, coacting bearings, one thereof formed with a continuous return groove winding around the same obliquely in reverse directions lengthwise of the upper portion of the bearing, the said bearing having in conjunction with the said groove a lubricant pocket with which the elevated portion of the groove communicates and from which lubricant passes into the groove, and also having below the said groove one or more continuous spiral return grooves interlapping with the former and with one another without intersecting.

3. In a vertical bearing for a rotating part, the combination of the said part and its bearing, one thereof having continuous spiral return grooves, one above the other, and interlapping with each other without intersecting.

In testimony whereof I affix my signature in presence of two witnesses.

ISAAC OSGOOD.

Witnesses:
    CHAS. F. RANDALL,
    EDITH J. ANDERSON.